United States Patent
Litz

[11] 3,729,209
[45] Apr. 24, 1973

[54] CONVERTIBLE CARRIER

[76] Inventor: Arthur Litz, 301 E. Hilborn, Apt. 2, Lodi, Calif. 95240

[22] Filed: Mar. 26, 1971

[21] Appl. No.: 128,390

[52] U.S. Cl. ............................... 280/36 R, 280/47.2
[51] Int. Cl. ............................................. B62b 3/04
[58] Field of Search ................ 280/36 R, 36 B, 36 C, 280/43.13, 40, 47.2, 47.27

[56] References Cited

UNITED STATES PATENTS

| | | | |
|---|---|---|---|
| 3,436,092 | 4/1969 | Werner | 280/36 R |
| 2,721,668 | 10/1955 | Elsner | 280/47.27 X |
| 2,884,257 | 4/1959 | Menne | 280/40 |
| 3,269,744 | 8/1966 | Dobson | 280/43.13 |

FOREIGN PATENTS OR APPLICATIONS 663,706   12/1951   Great Britain........................280/47.2

Primary Examiner—Benjamin Hersh
Assistant Examiner—John A. Pekar
Attorney—Clarence A. O'Brien and Harvey B. Jacobson

[57] ABSTRACT

A carrier including an upright support frame adjustably mounted on a wheel assembly which selectively orientates the wheels for movement of the carrier in the manner of a hand truck or alternatively in the manner of a four wheel supported cart. The support unit is vertically adjustable relative to the wheel assembly by means of a carrier mounting jack apparatus.

6 Claims, 12 Drawing Figures

Patented April 24, 1973
3,729,209
3 Sheets-Sheet 1
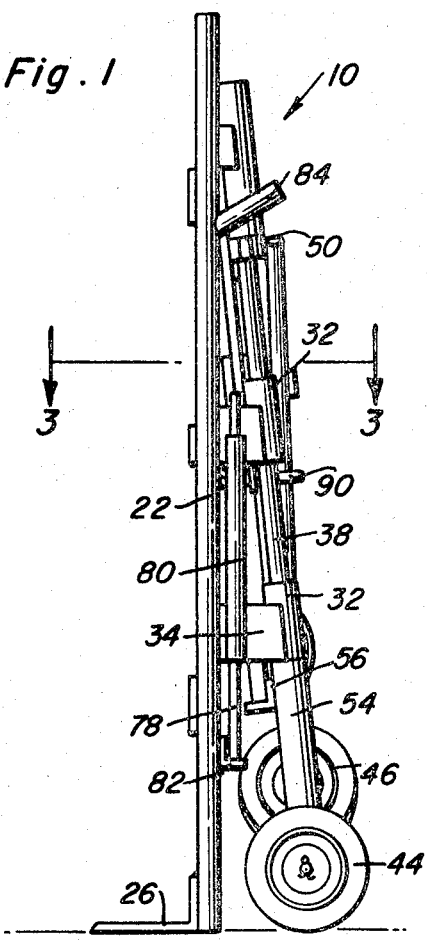
Fig. 1
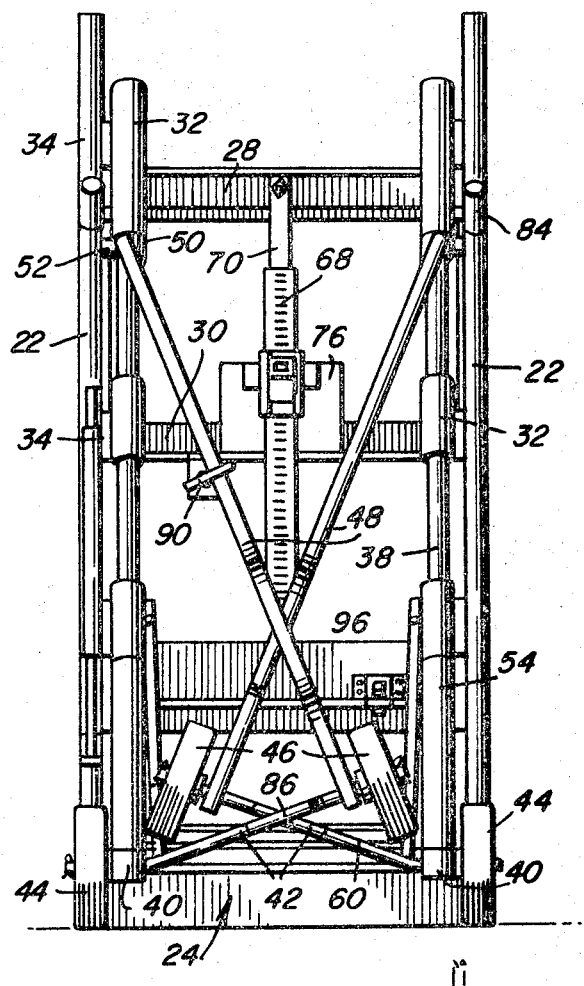
Fig. 2
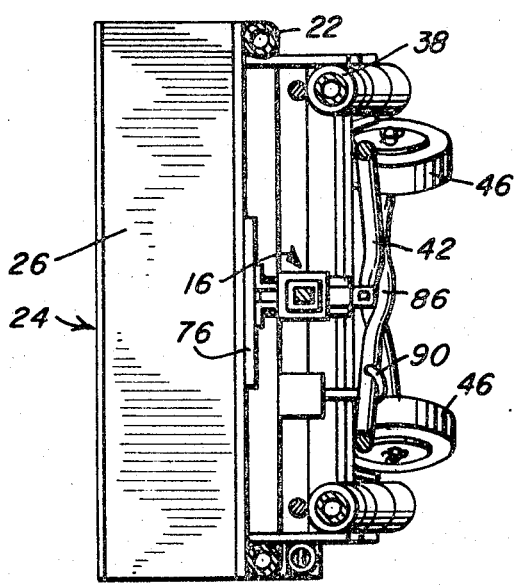
Fig. 3
Fig. 12
Arthur Litz
INVENTOR
BY Clarence A. O'Brien
and Harvey B. Jacobson
Attorneys Patented April 24, 1973

Arthur Litz
INVENTOR.

BY Clarence A. O'Brien
and Harvey B. Jacobson
Attorneys

Patented April 24, 1973
3,729,209
3 Sheets-Sheet 3
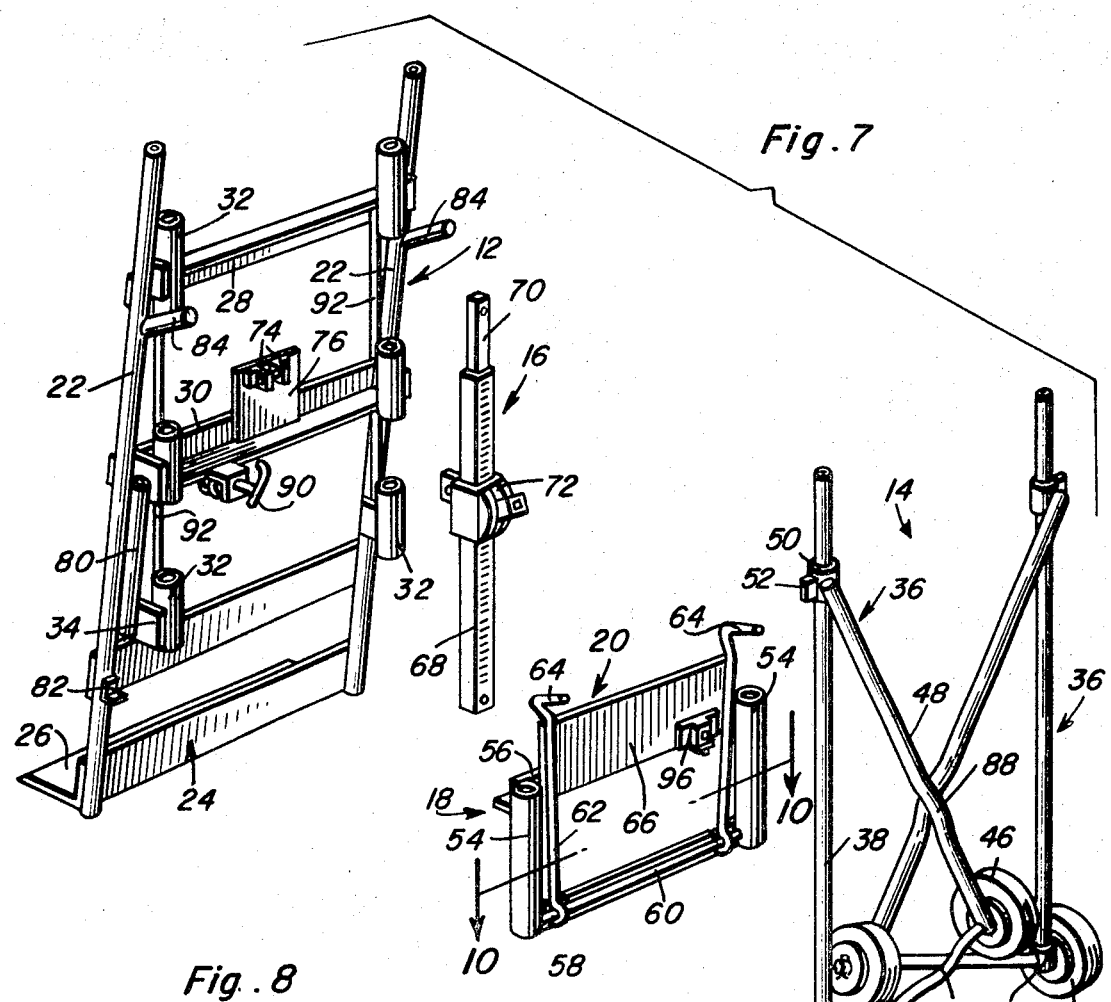
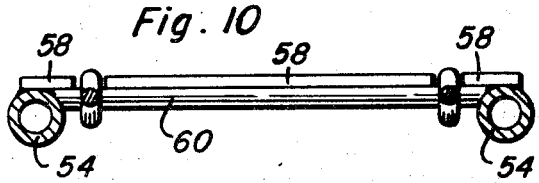
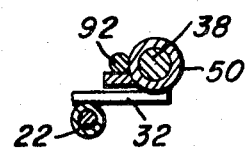
Arthur Litz
INVENTOR.
BY Clarence A. O'Brien
and Harvey B. Jacobson
Attorneys

CONVERTIBLE CARRIER

The instant invention is primarily concerned with a convertible carrier, and is particularly directed to a carrier alternatively usable in the manner of a two wheel hand truck or a four wheel self-supporting cart.

It is a primary object of the instant invention to provide a carrier which is uniquely adapted for the handling of large long loads, for example pool tables, bed springs or the like, in a manner whereby a complete control thereof can be effected by a single person.

In conjunction with the above object, it is a significant object of the instant invention to provide a device whereby large and normally awkward loads can be easily moved through doorways, along narrow passageways, and from one elevation to another in a simple and highly effective manner utilizing a compact and easily manipulable carrier.

Further objects of the instant invention include the provision of a carrier which is of a rigid and highly stable construction and which can be quickly converted from one operation to another even while supporting a load.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view of the carrier in its collapsed or hand truck position;

FIG. 2 is a rear elevational view of the collapsed carrier;

FIG. 3 is a top plan view thereof;

FIG. 7 is an exploded perspective view of the components of the carrier;

FIG. 8 is a detail view of the retaining mechanism for the collapsed wheel assembly;

FIG. 9 is a cross-section detail illustrating the abutment means utilized to position the wheel assembly in its extended position;

FIG. 10 is a cross-sectional detail substantially on line 10—10 in FIG. 7;

FIG. 12 is a cross-sectional detail of the auxiliary ledge mounted on the main support ledge.

Figure 4:
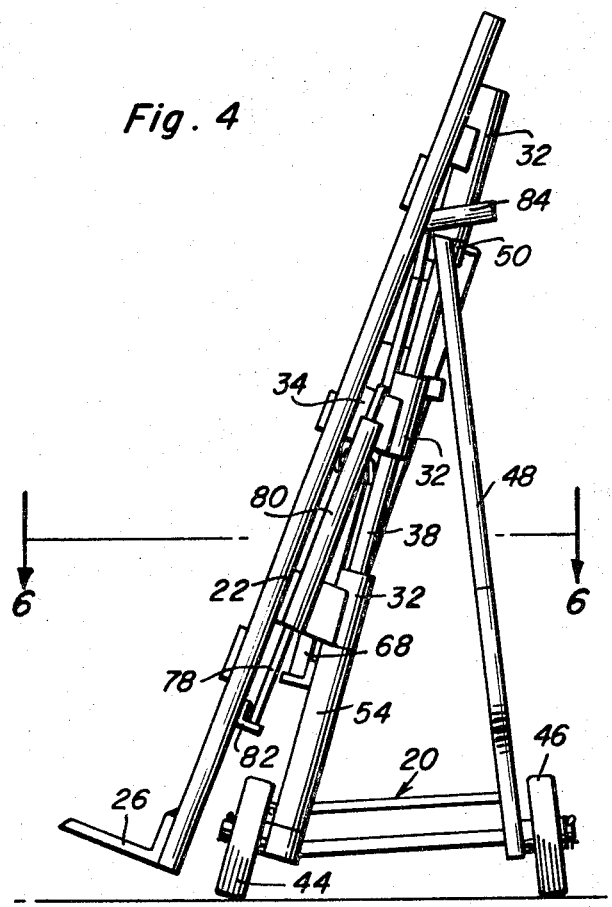
FIG. 4 is a side elevational view of the carrier in its expanded or cart forming position.

Referring now more specifically to the drawings, reference numeral 10 is used to generally designate the carrier comprising the instant invention. The carrier 10 consists primarily of a main body or support unit 12, a wheel assembly 14 which mounts the support unit 12 for vertical adjustment, jacking apparatus 16 utilized to effect the vertical adjustment of the support unit 12, a jack mounting unit 18, and a wheel assembly brace unit 20 pivotally mounted on the jack mounting unit 18.

The support unit 12 includes a pair of elongated side rod or tubular support members 22 orientated in laterally spaced parallel relation to each other. The support members 12 are interconnected at their lower ends by a transversely extending angle bar 24 which presents a forwardly projecting load receiving support ledge 26. The two support members are additionally interconnected by transversely extending rigid bars including an upper angle bar 28 facing downwardly and rearwardly, and an intermediate angle bar 30 facing upwardly and rearwardly.

Three mounting sleeves 32 are affixed in vertically spaced alignment with each other in rearwardly and laterally inwardly spaced relation to each support member 22 along the length thereof by means of mounting plates 34 welded to each individual sleeve 32 and the corresponding support member 22. These sleeves 32 are orientated at an angle relative to the corresponding support members 22 so as to in effect converge upwardly relative thereto so as to, upon a mounting of the wheel assembly 14 therein as shall be described presently, enable a stable vertical orientation of the support unit 12 when utilized as a hand truck such as illustrated in FIG. 1.

The wheel assembly 14 consists of two wheel units 36. Each wheel unit 36 includes an elongated support rod or shaft 38 having a cap 40 fixed to the lower end thereof. An elongated axle 42 extends through the cap 40 and mounts a first wheel 44 immediately adjacent the shaft 38 to one side thereof and a second wheel 46 in inwardly and upwardly spaced relation to the opposite side of the shaft 38. In other words, the axle 42 angles upwardly at an acute angle relative to the shaft 38 between the shaft 38 and the inwardly located wheel 46. The end of the axle 42 adjacent the spaced wheel 46 is braced by a diagonal brace bar 48 fixed to the axle 42 and extending upwardly therefrom to a shaft mounted collar 50 including a laterally projecting positioning lug 52 thereon.

The jack mount 18 includes a pair of laterally spaced parallel sleeves 54 interconnected at their upper ends by an upwardly and forwardly directed transversely extending angle bar 56. Extending between the sleeves 54 is an elongated rod 60 having a rigidifying bar 58 welded thereto. The bar 58 is formed in three sections, as will be best appreciated from FIG. 10, to completely expose rod 60 at two points to pivotally mount the wheel brace 20. The combined bar 58 and rod 60 are welded to the sleeves 54.

The wheel brace 20 includes a pair of laterally spaced parallel rods 62 having first ends pivotally mounted on the exposed portions of the rod 60 immediately inward of the sleeves 54, and second ends terminating in rearwardly and downwardly directed hooks 64. The rods 62 are interconnected, adjacent the hooks or hooked ends 64 thereof, by a rigid flat transversely extending plate 66.

In assembling the components just described, the jack mount sleeves 54 are positioned over the wheel assembly shafts 38 and rest on the cap lower ends 40 thereof. The wheel assembly shafts 38 are then extended through the lower two pairs of sleeves 32 on the support unit 12, after which the brace mounting collars 50 are mounted and the upper ends of the shafts 38 continued through the upper pair of sleeves 32, the collars 50, as previously indicated, being welded or otherwise fixed to the shafts 38 for rotation therewith as shall be described presently.

The jacking apparatus 16 is preferably a ratchet jack and is positioned with the lower end portion of the jack rack or shaft 68 resting on and bolted to the forwardly directed angle bar 56. The upper end of the shaft 68 is stabilized by a telescopically slidable bar 70 which has the upper end portion thereof welded to the uppermost cross angle member 28 on the support unit 12. The movable block or pinion unit 72 on the jack assembly 16 has the projecting lug thereon pivotally pinned to a pair of rearwardly directed ears 74 on a mounting plate 76 affixed to the intermediate angle bar 30. The jack 16 is actuated in a conventional manner utilizing an elongated removable handle 78 which can be temporarily stored in an elongated storage sleeve 80 affixed to one side of the support unit 12, a small angle section 82 receiving and supporting the lower end of the jack handle 78. As will be readily apparent, upon an activation of the jacking apparatus 16, the support unit 12 can be raised or lowered relative to the wheel assembly 14, this ability to raise and lower the load supporting unit greatly facilitating the movement of a load from one level to another.

Noting FIGS. 1–6, it will be appreciated that the wheel assembly 14 pivots between a first hand truck forming position and a second cart forming position. In the hand truck forming position, the wheels 44 are positioned so as to be forwardly directed and in engagement with the ground for a manipulation of the carrier in the manner of a conventional hand truck, appropriate rearwardly angled handles 84 being provided as required. In this position, the upwardly angled axles 42 position the inner wheels 46 in an inwardly spaced elevated position immediately rearward of the load support unit 12. The two axles 42 include minor offsets 86 therein so as to enable a compact collapsing of the wheel assemblies. Likewise, the diagonal braces 48 also include appropriate offsets 88 therein. In order to retain the wheel assemblies in their collapsed position, an appropriate spring-loaded retaining latch 90 is mounted on the intermediate angle bar 30 and projects rearwardly therefrom for selective engagement with the rearmost brace bar 48 upon a collapsing of the wheel assembly units 36. This latch 90, as will be readily appreciated, is manually actuated, and easily pivoted both into and out of engagement with the bar 48. The particular construction of the latch bar assembly will be readily appreciated from FIG. 8.

Figure 5:
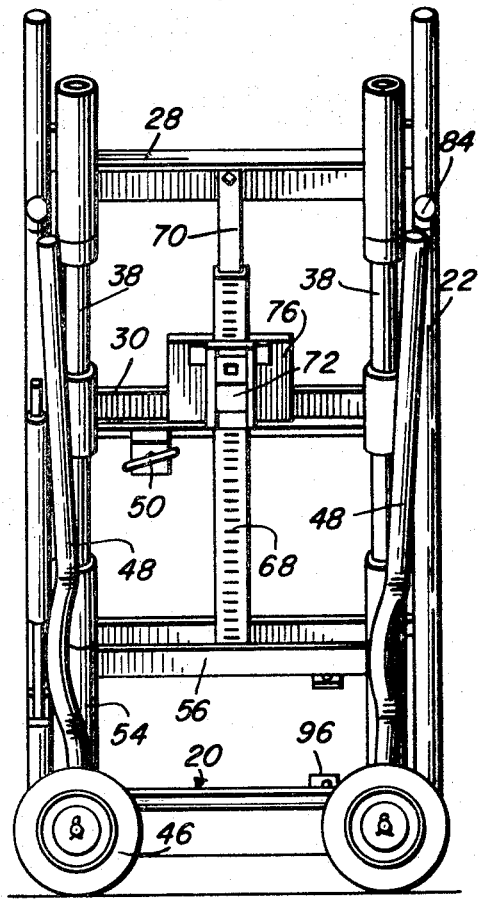
FIG. 5 is a rear elevational view of the expanded carrier.
Figure 6:
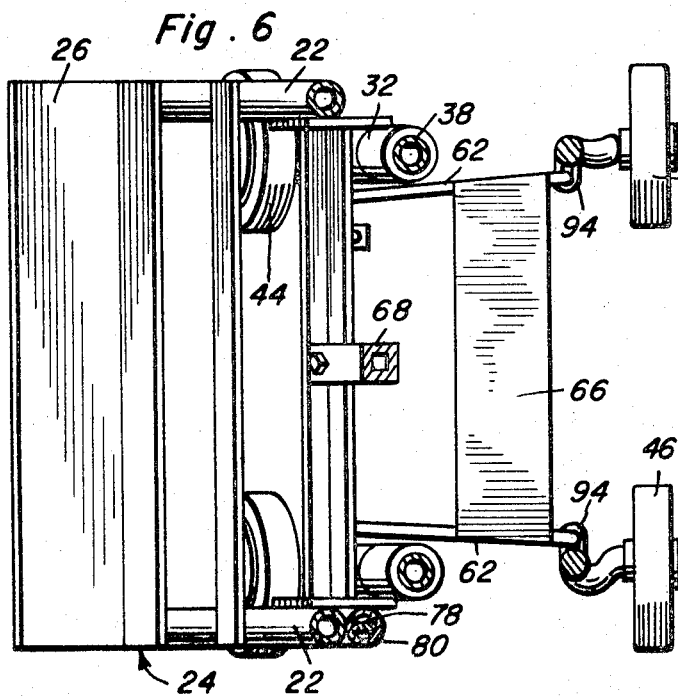
FIG. 6 is an enlarged cross-sectional view taken substantially on a plane passing along line 6—6 in FIG. 4.

In expanding the carrier 10 into the cart forming position of FIGS. 4, 5 and 6, the latch 90 is released and the two wheel assembly units 36 swung outwardly until the positioning lugs 52 engage narrow vertically elongated stop rods 92 provided on the support unit 12 to limit the outward swinging of the wheel assembly units 36 and retain this outwardly swung orientation during the vertical adjustment of the support unit 12. Upon an outward swinging of the wheel assembly units 36, it will be appreciated that the four wheels 44 and 46 are pivoted so as to be orientated laterally of the support unit rearwardly thereof for a lateral traveling of the carrier 10 in the manner of a four wheel cart. The inclination of the wheel unit shafts 38 result in, upon a rotation thereof, a movement of the upwardly spaced inner wheels 46 down to ground level whereby the basic vertical orientation of the support unit can be maintained at an angle approximately equivalent to the angle at which the unit would be manipulated when used as a hand truck.

Upon an outward swinging of the wheel units 36, the wheel brace assembly 20 is swung downwardly and the hooked ends 64 of the rods 62 engaged within a pair of loops or eyes 94 welded to the braces 48 immediately above the axles 42, thus resulting in a stabilization of the wheel assembly 14. Incidentally, when the wheel brace 20 is vertically collapsed, it is retained in its collapsed position through appropriate catch means engaged between the plate 66 and the jack support crossbar 56, such catch means being generally designated by reference numeral 96.

From the foregoing, it will be appreciated that a highly unique carrier has been defined. The carrier, in addition to being usable in the manner of a conventional hand truck, can, through a quick manipulation of a pair of wheel units, convert to an upright four-wheeled cart for a lateral transporting of the load. This is particularly significant in those situations wherein it is required that a truck mounted load be moved through doorways, along narrow halls, and the like. In addition, the load support unit of the carrier is vertically adjustable through a jacking apparatus. This in turn will greatly simplify the elevating of a load from one level to another, such as the movement of a load from a loading dock to a transport truck. The manipulation and adjustment of the carrier can easily be effected by a single person when either unloaded or fully loaded.

Figure 11:
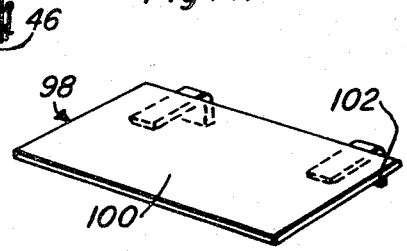
FIG. 11 is a perspective view of an auxiliary support ledge.

Finally, with reference to FIGS. 11 and 12, it is also contemplated that an extra wide auxiliary support ledge 98 be provided. This ledge comprises a flat plate 100 having a pair of depending lugs 102 which engage through slots in the ledge 26 to increase the effective load carrying surface thereof. The lug and slot interengagement also allows the plate 100 to be selectively swung vertically to a stored position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A convertible carrier comprising an upright load support unit, a wheel assembly mounting said support unit, said wheel assembly comprising first and second wheel means simultaneously rotatable between first and second positions, said first wheel means, in said first position, being oriented generally perpendicular to said support unit in ground engagement for a rolling movement of the support unit in a first direction in the manner of a hand truck, said second wheel means, in the first position, being elevated relative to said first wheel means and out of engagement with the ground, said first wheel means, in the second position, being oriented in ground engagement at approximately right angles to the first position thereof for a lateral movement of the support unit, said second wheel means, in the second position, paralleling the first wheel means in ground engaging spaced relation thereto for cooperation therewith in rollingly supporting said support unit, each of said wheel means comprising a pair of wheels, said wheel means, in the second position thereof, defining a four-wheel support for said carrier for movement of a cart, said support unit including vertically oriented sleeve means along the opposed sides thereof, said wheel assembly comprising a pair of wheel units, each wheel unit including a vertically elongated shaft rotatably received within one of said sleeve means, a transverse axle fixed to the lower end of each shaft for rotation therewith, said axle extending perpendicular from one side of said shaft and mounting a wheel of the first wheel means thereon, said axle projecting from the opposite side of the shaft at an acute angle thereto and mounting a wheel of the second wheel means on the outer end thereof.

2. The carrier of claim 1, wherein said wheel means assume said first and second positions through a rotatable swinging of the wheel unit shafts, and means for selectively locking each wheel unit into rotatably adjusted positions corresponding to said first and second positions.

3. The carrier of claim 2, including means for vertically adjusting said support unit relative to said wheel assembly.

4. The carrier of claim 3, wherein said means for vertically adjusting the support unit comprises a jack apparatus engaged between the wheel assembly and support unit for effecting a vertical sliding of the support unit sleeves along said wheel unit shafts.

5. The carrier of claim 4 wherein the sleeve means associated with each edge of the support unit is located slightly laterally thereof and orientated so as to converge upwardly toward the upper end of the support unit.

6. A convertible carrier particularly adapted for large panel-like loads, said carrier including an upright support unit, said support unit having a front face incorporating a load receiving means, and a rear face, sleeve means fixed to the rear of said support unit along the opposed side edges thereof, a vertically elongated shaft rotatably received through each sleeve means, each shaft mounting a first roller on the lower end thereof for rotation therewith between a first position perpendicular to the support unit and a second position parallel thereto, each shaft also mounting an elongated axle on the lower end thereof, said axle projecting at an acute angle from said shaft, a second wheel mounted on the outer end portion of said axle and orientated in laterally spaced relation to the first wheel, said axle and second wheel being rotatably swingable with said shaft and orientated in a first elevated position centrally to the rear of said support unit when the first wheel is orientated perpendicular to said support unit, and in a second position in rearwardly spaced generally coplanar alignment with the first wheel when said first wheel generally parallels said support unit.

* * * * *